(12) United States Patent
Savage

(10) Patent No.: US 12,173,821 B2
(45) Date of Patent: Dec. 24, 2024

(54) ADJUSTABLE ASSEMBLY FOR CONNECTING A SPRINKLER-BRANCH LINE TO A FIRE-SPRINKLER HEAD

(71) Applicant: Thomas Savage, Dylestown, PA (US)

(72) Inventor: Thomas Savage, Dylestown, PA (US)

( * ) Notice: Subject to any disclaimer, the term of this patent is extended or adjusted under 35 U.S.C. 154(b) by 0 days.

(21) Appl. No.: 17/581,451

(22) Filed: Jan. 21, 2022

(65) Prior Publication Data

US 2022/0316636 A1    Oct. 6, 2022

Related U.S. Application Data

(63) Continuation-in-part of application No. 17/399,011, filed on Aug. 10, 2021.

(60) Provisional application No. 63/139,960, filed on Jan. 21, 2021.

(51) Int. Cl.
*F16L 27/12*    (2006.01)
*A62C 35/68*    (2006.01)
*F16L 43/00*    (2006.01)

(52) U.S. Cl.
CPC .............. *F16L 27/12* (2013.01); *A62C 35/68* (2013.01); *F16L 43/00* (2013.01)

(58) Field of Classification Search
CPC ....... F16L 27/12; F16L 27/125; F16L 27/127; F16L 43/00; F16L 47/18
See application file for complete search history.

(56) References Cited

U.S. PATENT DOCUMENTS

| | | | | |
|---|---|---|---|---|
| 381,008 A * | 4/1888 | Gould | ..................... | F16L 27/12 285/11 |
| 1,191,886 A * | 7/1916 | Glauber | .................. | F16L 27/12 285/302 |

* cited by examiner

*Primary Examiner* — Aaron M Dunwoody
(74) *Attorney, Agent, or Firm* — Axenfold Law Group, LLC

(57) ABSTRACT

Assembly for connecting a branch line to a fire-sprinkler head, and for adjusting longitudinal and horizontal position of the sprinkler head. The assembly may include: a first-pipe section, a second-pipe section, and a third-pipe section. First-pipe section has telescoping lower and upper pipes configured to travel axially relative to each other upwardly and downwardly along a longitudinal axis. Second-pipe section has telescoping right, and left pipes configured to travel axially relative to each other along a horizontal axis. Third-pipe section is between first-pipe section and second-pipe section, and is curved. First-pipe section is configured to engage a sprinkler head and permit the sprinkler head to travel longitudinally upon telescopic adjustment of the lower and upper pipes. Second-pipe section attaches to the sprinkler-branch line, and permits the sprinkler head to travel horizontally upon telescopic adjustment of the right and left pipes with respect to each other.

4 Claims, 5 Drawing Sheets

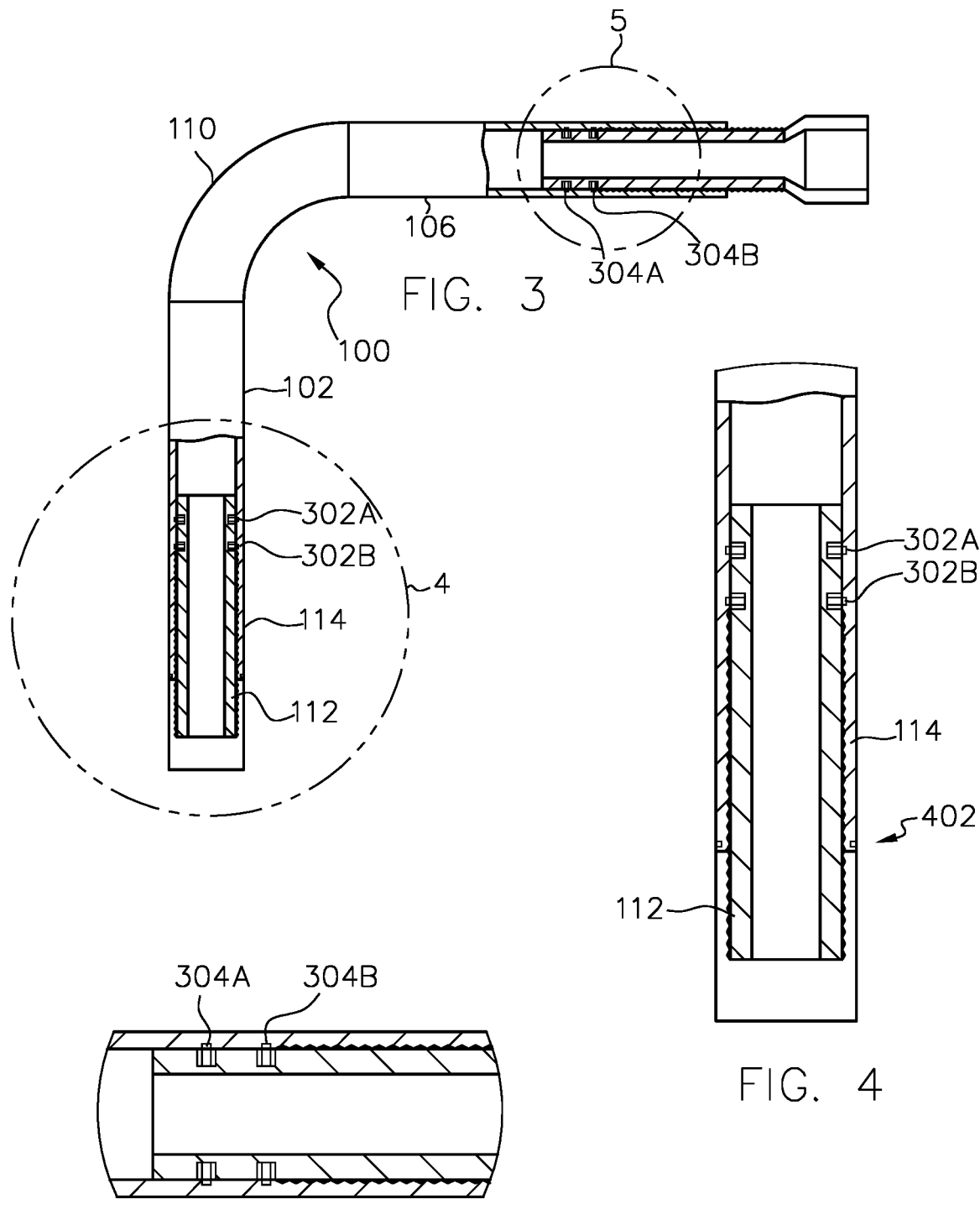

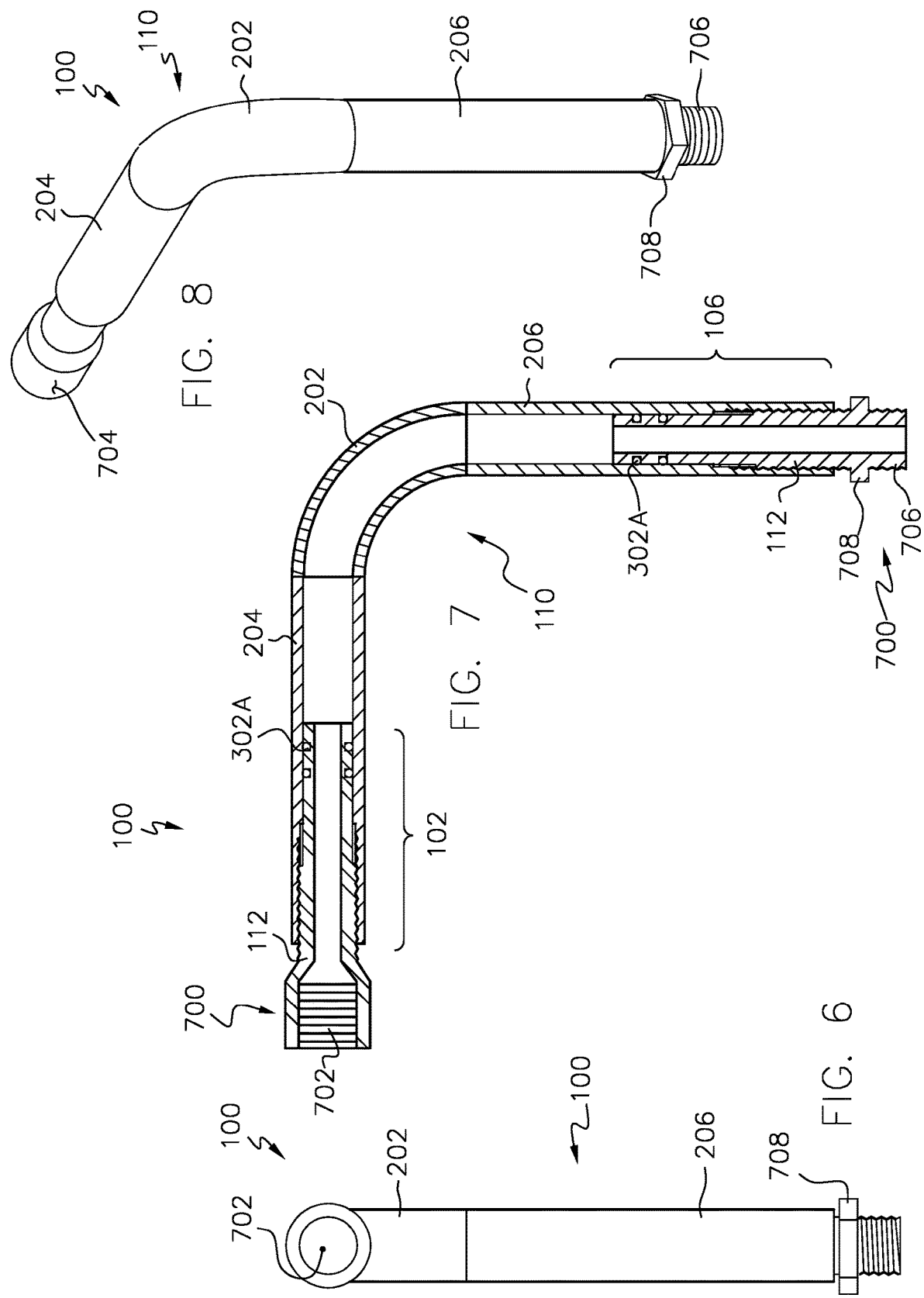

ADJUSTABLE ASSEMBLY FOR CONNECTING A SPRINKLER-BRANCH LINE TO A FIRE-SPRINKLER HEAD

CROSS REFERENCE TO RELATED APPLICATIONS

This application is a continuation in-part of U.S. Utility patent application Ser. No. 17/399,011, filed Aug. 10, 2021, entitled "Assembly for connecting a sprinkler-branch line to a fire sprinkler head, and for adjusting the position of the sprinkler head", and claims the benefit of U.S. Provisional Patent Application No. 63/139,960 filed 21 Jan. 2021, entitled "Assembly For Connecting A Sprinkler-Branch Line To A Fire-Sprinkler Head, And Method Of Making Same." The entirety of these applications is hereby incorporated by reference.

BACKGROUND

Sprinkler systems protect against fire. When ceiling sprinklers are installed above a room in a building, the water-distribution piping is usually mounted in the space between a ceiling and the floor (or roof) above the ceiling. The water-distribution system usually includes a sprinkler-branch line from which piping is attached for distribution to a plurality of sprinkler heads. Sprinkler heads typically reside below the ceiling, such as a drop or finished ceiling.

Installation of the piping from the sprinkler-branch line to each sprinkler head in a room is usually the most challenging portion of installing a fire-sprinkler system in a building.

For instance, it is challenging to adjust the height of each fire-sprinkler head just below the ceiling so that each sprinkler is positioned in proper alignment with the ceiling, and with other sprinklers in a room.

For example, piping must be adjusted from the branch line to reach a specific location in the ceiling due to the National Fire Protection Association ("NFPA") rules on sprinkler spacing (typically 10'×10' or similar as defined by the sprinkler data sheet) as well as architectural demands for symmetry in the visual appearance of the sprinkler heads when seen from below in a finished room.

To properly position each sprinkler head, care must be taken to properly cut the pipe lengths used to connect each sprinkler head to the branch line so that each sprinkler head is positioned at the correct position. Often this means re-cutting or pre-cutting numerous lengths of pipe to choose from. Measuring, cutting, recutting, and testing each pipe section is time consuming, and materially costly.

The exacting quality and mechanical challenges involved in installing a fire sprinkler system also requires a highly skilled pipefitter which can increase labor costs on a job when working with hard-pipe solutions.

In many instances when a pipe fitter attempts to cut the various horizontal and vertical pipe sections to length, there may be some piping that is off in length by a small amount, i.e., between a half inch to three or more inches. However, these small differences in length often result in the improper location of a sprinkler head, unless adjustments are made.

One adjustment a pipefitter can make is to spend the time to cut and re-cut the piping. This results in lost time, because usually the cutting and threading machine is not next to the sprinkler head. Further, piping must be measured and re-measured. There is also increased risk of injury to the pipefitter who must make additional trips up and down a ladder, because the piping adjacent the branch line is generally 10 feet, 15 feet, or more above the floor.

Another possible solution is for the contractor to pre-cut various lengths of pipe (called pipe nipples) for the vertical section of piping. This requires extra work on the part of the pipefitter, and usually results in supplying more pipe on a jobsite than is needed.

Still another possible solution is for the contractor to purchase pre-cut pipe lengths from fabricators. This option is expensive and adds to the costs of materials, and may result in delays due to the desired-sized length not being available.

Adjusting the length of piping to position the sprinkler head at different heights, and to account for imperfect lengths of piping, has been approached by use of drop nipples, which can be adjusted in length to customize the height of the sprinkler head. For instance, a drop-nipple assembly allows for the vertical positioning of a drop nipple at a selected height where a sprinkler head can be attached thereto.

However, there is no adequate solution to adjust for both the horizontal and vertical length of a sprinkler head using the least expensive materials (usually hard piping), without resorting to the aforementioned time-consuming and expensive solutions involving an experienced pipefitter.

SUMMARY

Described below is an assembly for connecting a sprinkler-branch line to a fire sprinkler head, and for adjusting the horizontal and vertical position of the sprinkler head.

In one aspect, the innovative assembly includes: a first-pipe section, a second-pipe section, and a third-pipe section. The first-pipe section has telescoping lower and upper pipes configured to travel axially relative to each other upwardly and downwardly along a longitudinal axis. The second-pipe section has telescoping right and left pipes configured to travel axially relative to each other along a horizontal axis. The third-pipe section joins the first-pipe section to the second-pipe section. The first-pipe section is typically adapted to engage a sprinkler head and to permit the sprinkler head to travel longitudinally upon telescopic adjustment of the lower and upper pipes. The second-pipe section is typically configured to attach for fluid communication from the sprinkler-branch line and to permit the sprinkler head to travel horizontally (e.g., right and left), upon telescopic adjustment of its right and left pipes with respect to each other, along a generally horizontal axis.

In other words, when the second-pipe section is fastened to receive fluid communication from a sprinkler-branch line, telescoping adjustment of its right and left pipes, inwardly or outwardly, with respect to each other along the horizontal axis, causes the third-pipe section (carrying the first-pipe section including the sprinkler head), to travel along the horizontal axis. Thus, by adjusting the distance between the first-pipe section's telescoping lower and upper pipes with respect to one another, and by adjusting the distance between the second-pipe section's telescoping right and left pipes with respect to one another, allows an installer to adjust the position of the sprinkler head both longitudinally and horizontally, respectively.

The above solution permits builders to use less expensive piping materials, less experienced workers than pipefitters, and sometimes, eliminate the need for brackets or connection to a ceiling structure. That is, the innovative solutions described in the Detailed Description section below may be implemented with just hard-piping, which is usually less expensive than flexible piping made of expensive metals. Although, as will be appreciated by those skilled in the art after having the benefit of this disclosure, any suitable materials for fire-sprinkler systems may be employed in accordance with the disclosure herein.

And as will become apparent to those skilled in the art after having the benefit of this disclosure, the innovative assembly eliminates the need for precise cutting and recutting of piping, saving time, materials, and money. Further, the innovative assembly is safer than conventional solutions, due to its inherent adjustability without the need for cutting and recutting. As a result, a pipefitter (or less skilled contractor) can make fewer trips up and down a ladder when installing each sprinkler head. The contractor needs to merely adjust the first and second-pipe sections to achieve three-dimensional positioning of the sprinkler head.

Because there is less need for a contractor to cut the hard piping and to adjust the pipe lengths so precisely, there are also fewer joints. Joints are potential weak spots in the system and can result in pipe corrosion due to decreased pipe thickness related to threading as well as damage from cold-forming mechanical grooves into the pipe to accommodate couplings. Additionally, each joint, whether threaded or grooved, represents a known potential leak path due to inconsistent and variable quality of threading and grooving. So, less joints means there are decreased chances for leaks, which translates into a fire-sprinkler system with less chance that the system must be taken offline to make leak repairs.

One embodiment includes a fluid conveyance conduit to provide a portion of a fluid path extending between a first plumbing element and a second plumbing element. Exemplary first and second plumbing elements nonexclusively include pipe nipples, unions, threaded sockets, and other elements conventionally incorporated in fluid-carrying plumbing arrangements. A first telescopic end fitting is generally carried at a first end of the fluid conveyance conduit. A second telescopic end fitting is generally carried at a second end of the fluid conveyance conduit. The first telescopic end fitting may be configured to provide a fluid-tight connection to the first plumbing element and the second telescopic end fitting may be configured to provide a fluid-tight connection to the second plumbing element to complete the fluid path. Each telescopic end fitting provides a user-selectable change in length along a telescopic length-adjusting axis. Therefore, a user may adjust a total length of the fluid path by way of either end fitting.

In a currently preferred embodiment, the first telescopic end fitting is configured to couple to a sprinkler head, and the second telescopic end fitting is configured to couple to an element of a hard pipe system. In general, a sprinkler head may be moved, because it forms a terminal element of a fluid path of a fire-fighting plumbing arrangement. Sometimes, both of the first telescopic end fitting and the second telescopic end fitting are configured to couple to an element of a pre-installed hard pipe system. In certain of such cases, plumbing elements disposed at each end of the fluid path may be regarded as immovable. Certain embodiments may be configured to permit user adjustment of a length of a telescopic end fitting subsequent to forming a fluid-tight connection between one telescopic end fitting and a cooperating immovable plumbing element. Other embodiments may be configured to permit length adjustment of the fluid path subsequent to forming fluid-tight connections between both of the first and second telescopic end fittings and respective cooperating first and second immovable plumbing elements.

Preferred embodiments may be configured to permit user-adjustment to impart a relative displacement between opposite ends of the fluid path in one-dimension, two-dimensions, or three-dimensions. Certain embodiments may be configured to permit length adjustment of the fluid path confined to a first direction and a second direction. The second direction may sometimes be orthogonal to the first direction. For example, an embodiment may be configured to permit length adjustment of the fluid path in both horizontal and vertical directions. Desirably, a user-selectable length of each telescopic end fitting is user-adjustable by a distance greater than about ½ inch.

Sometimes, a fluid conveyance conduit can include a hard pipe element. Further, a fluid conveyance conduit can include a transversely displaceable length of resilient tubing. An intermediate member may be disposed somewhere between the first and second telescopic end fixtures, the intermediate member being transversely flexible to align a length axis of one telescopic end fitting at a selected parallel or nonparallel orientation with respect to a length-adjusting axis of the other telescopic end fixture. One workable intermediate member may be configured such that the selected orientation may be one of an infinite number of possible orientations.

An exemplary first telescopic end fitting includes a male member and a cooperating female member. A workable male member carries first straight threads on a first OD. A cooperating female member carries second straight threads on a first ID, the first and second straight threads being cooperatively sized to engage and permit user adjustment of a relative position of the male member with respect to the female member, and thereby, to adjust a total length of the telescopic end fitting along a telescopic length-adjusting axis of the telescopic end fitting. A first fluid seal element is desirably carried by the male member for reciprocal fluid-tight sealing engagement of the first fluid seal element between the male and female members.

Sometimes, the male member can be an integral extension of the fluid conveyance conduit. In one such embodiment, and prior to assembly, an ID of the first fluid seal element is smaller than a maximum pitch diameter of the first straight threads. In that embodiment, the telescopic end fitting is configured to require the fluid seal element to traverse proximally across the first straight threads during an assembly step.

In certain embodiments, a proximal end of the female member has a first diameter sized to receive the male member, and a distal end of the female member is necked-down to provide a second diameter that is smaller than the first diameter. In certain cases, a distal end of the female member carries a length of inside pipe threads having a nominal pipe thread diameter smaller than the maximum pitch diameter of the first straight threads, the inside pipe threads to couple to one of the first and second plumbing elements. In other cases, a distal end of the female member may carry a length of outside pipe threads, the outside pipe threads to couple to one of the first and second plumbing elements.

A fluid seal element may be configured and disposed in harmony with an obstruction carried at the proximal end of a female member to form a structural interference and resist undesired disassembly of a telescopic end fitting in a distal direction. Sometimes, and subsequent to partial assembly, a proximal end of the female member is crimped to entrap the first fluid seal and resist disassembly of the telescopic fitting in the distal direction (e.g., joint-separation direction).

This summary is provided to introduce a selection of concepts in a simplified form that are further described below. This summary is not necessarily intended to identify key features or essential features of the claimed subject matter, nor is it necessarily intended to be used as an aid in determining the scope of the claimed subject matter.

The foregoing outlines examples of this disclosure so that those skilled in the relevant art may better understand the detailed description that follows. Additional embodiments and details will be described hereinafter. Those skilled in the relevant art should appreciate that they can readily use any of these disclosed embodiments as a basis for designing or modifying other structures or functions for carrying out the invention, without departing from the spirit and scope of the invention.

Reference herein to "one embodiment," "an embodiment," "an aspect," "an implementation," "an example," or similar formulations, means that a particular feature, structure, operation, or characteristic described in connection with the embodiment is included in at least one embodiment of the present invention. Thus, different appearances of such phrases or formulations herein do not necessarily refer to the same embodiment. Furthermore, various particular features, structures, operations, or characteristics may be combined in any suitable manner in one or more embodiments.

BRIEF DESCRIPTION OF THE DRAWINGS

The detailed description below is presented with reference to the accompanying figures. The figures are not necessarily drawn to scale. Certain figures include artifacts contemporaneously inherent in machine conversion of a 3-D model into a 2-D representation. For example, compressed O-rings in the 3-D model may appear as structural interferences in a 2-D representation. One of ordinary skill will apprehend the true conveyance of information. That said, in the drawings:

FIG. 3 is a side view, partially in cross-section, of the embodiment in FIG. 1;

FIG. 4 is a close-up view of that portion of the embodiment in FIG. 3 indicated by the phantom line circle indicated at numeral 4;

FIG. 5 is a close-up view of that portion of the embodiment in FIG. 3 indicated by the phantom line circle indicated at numeral 5;

FIG. 6 is an end view in elevation of the embodiment in FIG. 7;

FIG. 7 is a side cross-section view in elevation of an embodiment according to certain principles of the embodiment in FIG. 1;

FIG. 8 is a view in perspective of the embodiment in FIG. 7;

DETAILED DESCRIPTION

Assembly Overview

Figure 1:
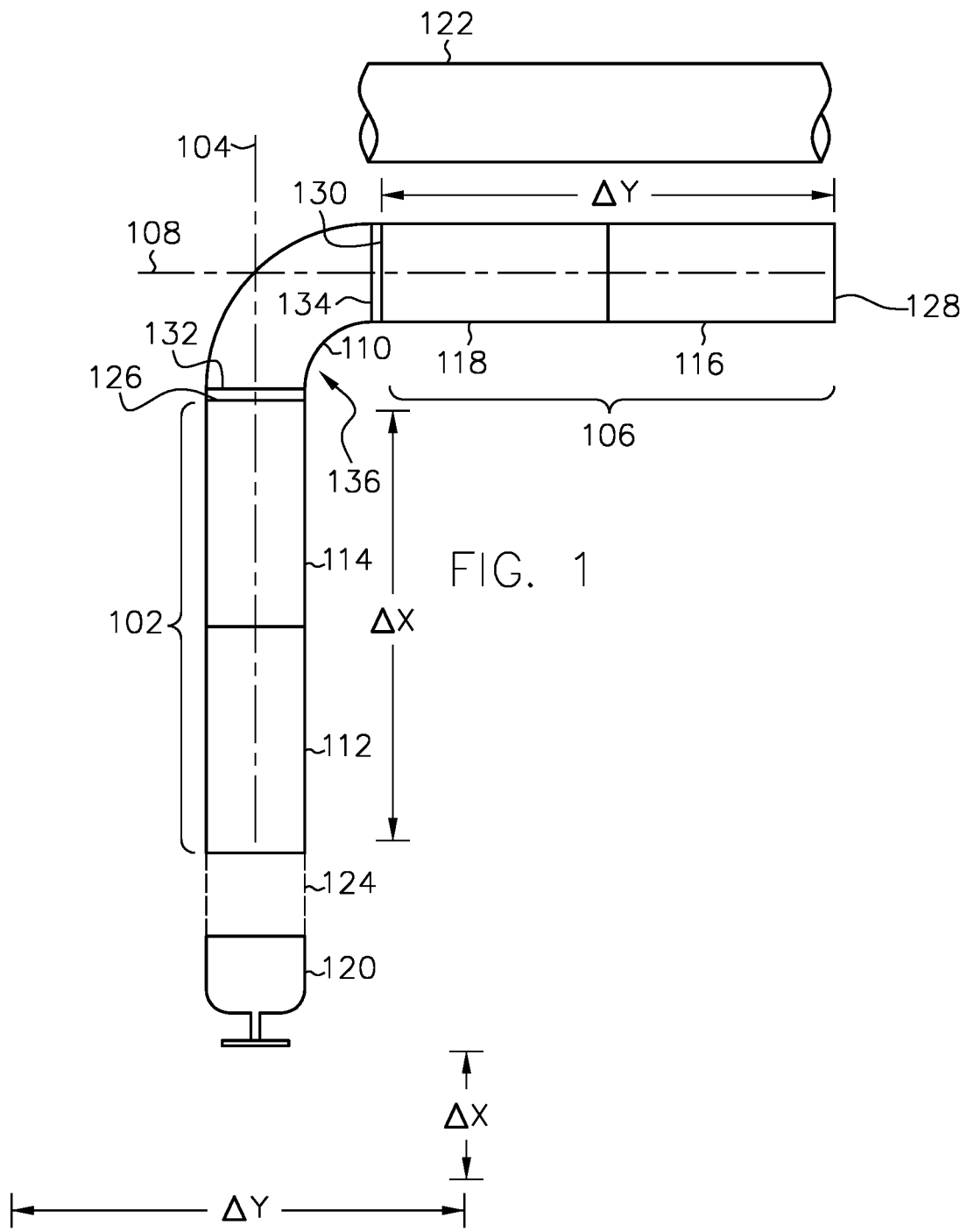
FIG. 1 shows a schematic side view illustration of an exemplary assembly for connecting a sprinkler-branch line to a fire-sprinkler head, and for adjusting the position of the sprinkler head vertically and horizontally.

FIG. 1 shows a schematic illustration of an exemplary assembly 100 for connecting a sprinkler-branch line 122 to a fire-sprinkler head 120, and for adjusting the position of the sprinkler head vertically and horizontally. Example assembly 100 in FIG. 1 is not drawn to scale.

Assembly 100 includes a first-pipe section 102 having a longitudinal axis 104, a second-pipe section 106 having a horizontal axis 108, and a third-pipe section 110 traversing longitudinal axis 104 and horizontal axis 108. Each pipe section may be composed of any suitable materials acceptable for use in a sprinkler system, including but not necessarily limited to, steel, brass, plastic, and other materials. In the example of FIG. 1, steel is selected. As appreciated by those skilled in the art, each section of piping may also include different combinations of the aforementioned materials. For example, first-pipe section 102 and second-pipe section 104 may be steel, while third-pipe section 110 may be comprised of stainless steel.

Example First-Pipe Section

In the example of FIG. 1, first pipe section 102 may be characterized as a telescopic end fitting. A telescoping fitting permits relative reciprocation of cooperating constituent elements along a telescopic length-adjusting axis to change a total length of the fitting. A telescopic fitting is distinguished over e.g., a threaded pipe joint that can be further tightened or loosened to slightly change a joint length. Length change of a joint is encompassed within the scope of a telescopic change in length of a telescopic fitting, but is not limited to that change in joint length. Tightening or loosening an exemplary pipe joint without causing a fluid leak is believed to permit a change in joint length of much less than about 0.1 inches. In contrast, embodiments constructed according to certain principles of the invention typically provide a telescopic length adjustment in excess of ½ inch.

In FIG. 1, telescopic fitting 102's constituent lower pipe 112 and upper pipe 114 may form an adjustable drop nipple. That is, first-pipe section 102 includes telescopically and sealingly engaged lower and upper pipes 112, 114, respectively. Engagement of lower pipe 112 to the upper pipe 114 may be accomplished by any suitable means, including grooves and internal threads (shown in FIGS. 3 and 4) and a sealing means, such as one or more O-ring (shown in FIGS. 3 and 4).

In one example, a portion of lower pipe 112 serves as an inner tube (i.e., narrower pipe) secured within a portion of upper pipe 114 (i.e. wider pipe) in a sealed and telescopic manner. That is, upper pipe 114 is fastened to lower pipe 112 with upper pipe 114 external to at least a portion of lower pipe 112. In an alternative arrangement, as appreciated by those skilled in the art after having the benefit of this disclosure, upper pipe 114 may be narrower than lower pipe 112 and be placed within a portion of lower pipe 112 in telescopic fashion.

As a drop nipple arrangement, lower pipe 112 and upper pipe 114 are configured to travel axially inward toward each other, and outward away from each other, along longitudinal axis 104. Put differently, lower pipe 112 and upper pipe 114 are movable relative to one another in an exemplary longitudinal plane (i.e., along longitudinal or telescopic length-adjusting axis 104).

Lower pipe 112 and upper pipe 114 may be selectively moved to a fully extended position (Max. ΔX) defining a fully extended position defining a maximum length of first-pipe section 102 measured from a distal end 124 and proximal end 126 of first-pipe section 102.

Lower pipe 112 and upper pipe 114 may be selectively moved along longitudinal axis 104 to a fully compressed position (Min. ΔX) defining a fully compressed position defining a shortest length of first-pipe section 102 measured from a distal end 124 and proximal end 126 of first-pipe section 102. Lower pipe 112 and upper pipe 114 may also be selectively adjusted in the opposite direction to any suitable distances in between Maximum ΔX, and Minimum ΔX measured from a distal end 124 and proximal end 126 of first-pipe section 102.

Distal end 124 of first-pipe section 102 is configured to engage sprinkler head 120 for discharge of fluid through the sprinkler head 120. Any suitable type of sprinkler head 120 may be selected. Sprinkler head 120 may have threads, grooves, or other fastening mechanisms for connection to lower pipe 112.

Thus, first-pipe section 102 is adapted to engage sprinkler head 120 and to permit the sprinkler head 120 to travel longitudinally upon telescopic adjustment of lower and upper pipes 112, 114, respectively, towards, or away from each other along a telescopic length-adjusting longitudinal axis 104.

Example Second Pipe Section

In the example of FIG. 1, second pipe section 106 may also be characterized as a telescopic end fitting. Its constituent right pipe 116 and left pipe 118 form an adjustable drop nipple. That is, second-pipe section 106 includes telescopically and sealingly engaged right and left pipes 116, 118, respectively. Engagement of right pipe 116 to the left pipe 118 may be accomplished by any suitable means, including grooves and internal threads (shown in FIGS. 3 and 5) and a sealing means, such as one or more O-ring (shown in FIGS. 3 and 5).

In one example, a portion of right pipe 116 serves as an inner tube (i.e., narrower pipe) secured within a portion of left pipe 118 (i.e., wider pipe) in a sealed and telescopic manner. That is, left pipe 118 is fastened to right pipe 116 with left pipe 118 external to, at least a portion, of right pipe 116. In an alternative arrangement, as appreciated by those skilled in the art after having the benefit of this disclosure, left pipe 118 may be narrower than right pipe 116, and be placed within a portion of right pipe 116 in telescopic fashion.

As a drop nipple arrangement, left pipe 118 and right pipe 116 are configured to travel axially inwardly toward each other, and outwardly away from each other, along a length-adjustable horizontal axis 108. Horizontal axis 108 may be characterized as a telescopic length-adjusting axis. Put differently, left pipe 118 and right pipe 116 are movable relative to one another in a horizontal plane (i.e., along horizontal axis 108) to adjust a length of the end fitting 106.

Left pipe 118 and right pipe 116 may be selectively moved to a fully extended position (Max. ΔY) defining a fully extended position defining a maximum length of second-pipe section 106 measured from a distal end 128 and proximal end 130 of second-pipe section 102.

Left pipe 118 and right pipe 116 may be selectively moved to a fully compressed position (Min. ΔY) defining a fully compressed position defining a shortest length of second-pipe section 106 measured from a distal end 128 and proximal end 130 of second-pipe section 106.

Left pipe 118 and right pipe 116 may also be selectively adjusted to any suitable distances in between Maximum ΔY and Minimum ΔY measured from a distal end 128 and proximal end 130 of second-pipe section 106.

Distal end 128 of second-pipe section 102 is configured to engage a branch line 122 either directly or indirectly via a collar, a "Tee", other pipe section, or plumbing element to form a connection in general. At distal end 128 of second-pipe section 106 is an inlet for assembly 100. As appreciated by those skilled in the art, any suitable connection mechanism may be employed, such as threads or grooves at distal end 128 of second-pipe section to connect, directly or indirectly, to sprinkler-branch line 122.

Proximal end 130 of second-pipe section 106 abuts third-pipe section 110, which is between first-pipe section 102 and second-pipe section 106. When third-pipe section 110 is fastened, or integrated (that is a portion of first, second and third pipe section are integral with each other to form a fluid-conveying path) with first-pipe section 102 and second-pipe section 106, second-pipe section 106 is configured to permit sprinkler head 120 to travel horizontally, right, and left, upon telescopic adjustment of the right 116 and left pipes 118 with respect to each other along horizontal axis 108.

Example Third Pipe Section

As mentioned above, third-pipe section 110 joins and is located between first-pipe section 102 and the second-pipe section 106. In the example of FIG. 1, bottom end 132 abuts proximal end 126 of first-pipe section 102. And, a top end 134 abuts proximal end 130 of second-pipe section 106.

Third-pipe section 110 may also be a separate section secured to an outer or inner surface of proximal end 126 of first-pipe section 102, and second-pipe section 106. For example, top end 134 may serve as an inner tube (i.e., narrower pipe) secured within a portion of left pipe 118 (i.e., wider pipe) in a sealed manner. And bottom end 132 may serve as an inner tube (i.e., narrower pipe) secured within a portion of upper pipe 114 (i.e., wider pipe) in a sealed manner. The fastening mechanisms may include any suitable fastening means such as threads, grooves, adhesives, or may be formed integral with first-pipe section 102, and second-pipe section 106, respectively.

In the example of FIG. 1, third-pipe section 110 is single-pipe conduit having a curved-pipe section 136, which is bent to form a permanent arc. In certain embodiments, the angle of bent third-pipe section may vary between about 10 degrees and 170 degree angles. In this illustrated embodiment, the angle of third-pipe section is bent to about a 90 degree angle. It is within contemplation that portions of a single-pipe 110 may constitute portions of telescopic end fittings 102 and 106.

Figure 2:
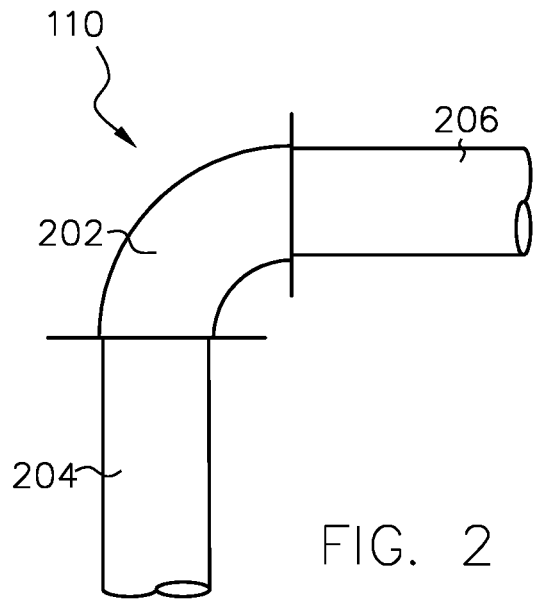
FIG. 2 shows a side view of an alternative example of a third-pipe section including an elbow having a predetermined angle, a first-pipe conduit, and a second-pipe conduit.

Third-pipe section 110 may also include multiple pipes and couplers. For instance, FIG. 2 shows a side view of an alternative example of third-pipe section 110 including an elbow 202 having a predetermined angle, a first-pipe conduit or coupler 204, and second-pipe conduit or coupler 206. Elbow 202 joins first-pipe conduit 204 to second-pipe conduit 206. In the example of FIG. 2, first-pipe conduit 204 is fastened to proximal end 126 of first-pipe section 102 and second-pipe conduit 206 is fastened to proximal end 130 of second-pipe section 106. It is within contemplation that a portion of a pipe or coupler 204, 206 may constitute a portion of a telescopic end fitting 102, 106.

Figure 2A:
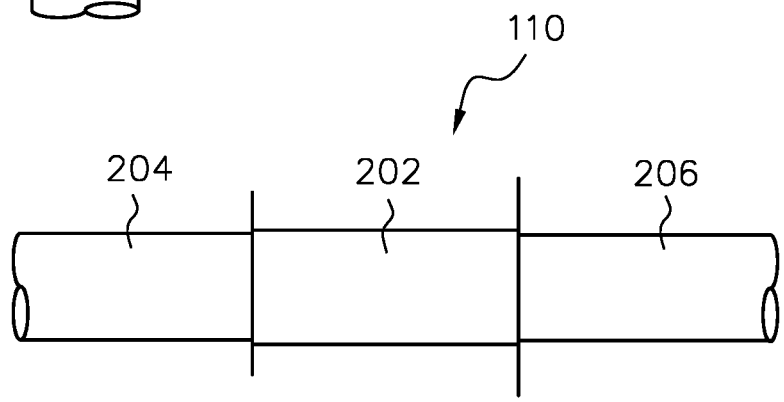
FIG. 2A is a side view of an alternative example of a third-pipe section including an elbow having an adjustable angle, a first-pipe conduit, and a second-pipe conduit.

FIG. 2A illustrates an alternative pipe section 110 including a portion 202 that is flexible and may be of any desired convenient length. Pipe section 110 may be formed into any desired angle, or may even sometimes be coiled. For example, a coiled section 202 may provide a significant length adjustment for a fluid flow conveying path between connections at spaced-apart plumbing elements (e.g., threaded aperture ends). One workable flexible pipe 110 may include a length of stainless-steel inner tube that is flexible (such as corrugated stainless steel pipe with a wire-braided exterior cover also made of stainless steel), or other suitable core, such as a rubber-core tubing having an optional braided steel cover or sheath. Certain commercially available examples of such flexible pipes 202 may include an externally disposed Stainless steel braided sheath. Workable joints between flexible tubing of a pipe section 110 and hard piping 102, 106 are known to one of ordinary skill.

Figure 2B:
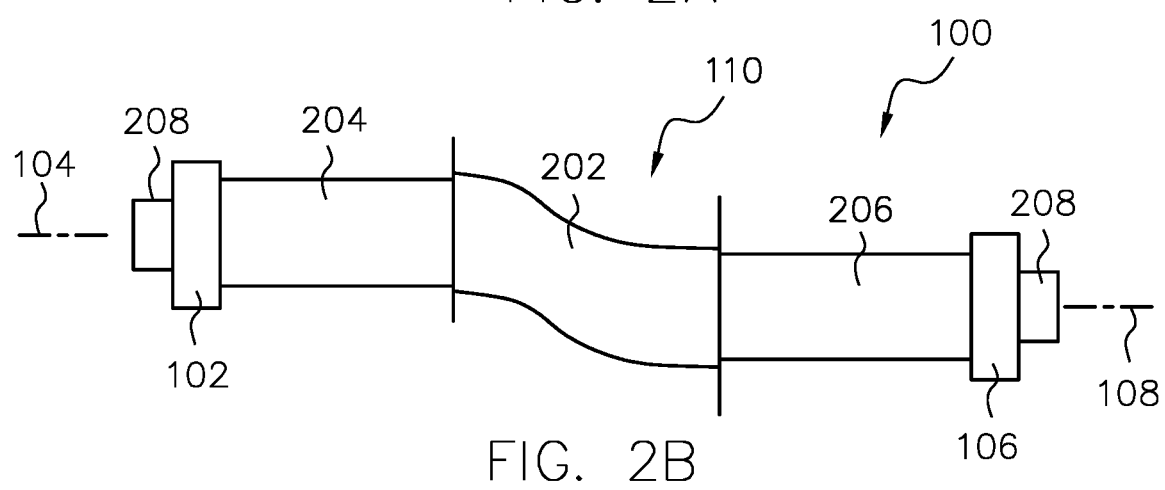
FIG. 2B is a side view of an alternative example of a third-pipe section including a flexible elbow having an adjustable angle, a first-pipe conduit, and a second-pipe conduit.

FIG. 2B illustrates an embodiment 100 including a flexible pipe section 110 installed to form a fluid conveying path between spaced-apart plumbing elements 208. Telescopic end fixtures 102 and 106 permit length adjustment along respective length axes 104 and 108, respectively. This embodiment 100 according to certain principles of the invention accommodates noncollinearity between axes 104 and 108. This embodiment 100 also may accommodate connection to spaced-apart plumbing elements 208 that require length-adjusting axes 104 and 108 to be nonparallel.

With continued reference to FIG. 2B, oppositely disposed telescopic end fixtures 102 and 106 facilitate bridging a gap between plumbing elements 208 that are disposed at relatively immovable positions. In that case, an illustrated embodiment 100 may be configured to permit removing compression or tension in the conduit assembly extending between the plumbing elements 208. For example, telescopic end fitting 102 may include right-hand length adjusting threads. Telescopic end fitting 106 may have cooperating left-hand threads as a portion of its length adjusting mechanism. Consequently, rotating conduit 110 in one direction will shorten a total length of the assembly 100 between the plumbing elements 208. Also, rotating conduit 110 in the opposite direction would increase a total length of the assembly 100 between the plumbing elements 208. Therefore, a total length of assembly 100 may be adjusted as desired to reduce or remove internal stress carried in the fluid conveyance conduit provided by assembly 100.

FIG. 3 shows a side view of an assembly 100 with partial cross-sectional views of first-pipe section 102 and second-pipe section 106. As shown, first-pipe section includes 102 includes two O-rings 302A, 302B to provide elastic-seal redundancy for a fluid-tight seal. Likewise, second-pipe section 106 includes two O-rings 304A, 304B to provide elastic-seal redundancy in second-pipe section 106. These O-rings may seat themselves inside recesses better shown in blown up cross-sectional views in FIGS. 4 and 5, of portions of first-pipe section 102 and second-pipe section 106, respectively. However, as appreciated by those skilled in the art after having the benefit of this disclosure, in each pipe section, there may be a single O-ring or more than two O-rings. Generally, the O-rings are sandwiched against the inner and outer surfaces of the two adjustable pipes.

Also as shown in FIGS. 3 and 4, a portion of lower pipe 112 serves as an inner tube (i.e., narrower pipe) secured within a portion of upper pipe 114 (i.e. wider pipe) engaged by male and female threading located on the outer and inner surfaces of pipes 112, 114. That is, upper pipe 114 is fastened to lower pipe 112 with upper pipe 114 external to, at least a portion, of lower pipe 112. Additionally, as shown in FIG. 4 there is swaging 402. As appreciated by those skilled in the art after having the benefit of this disclosure, distal end 124 of section 102 could also be flared in lieu of swaging.

As shown in FIGS. 3 and 5, a portion of right pipe 116 serves as an inner tube (i.e., narrower pipe) secured within a portion of left pipe 118 (i.e., wider pipe) in a sealed and telescopic manner by threading. That is, left pipe 118 is fastened to right pipe 116 with left pipe 118 external to, at least a portion, of right pipe 116 by male and female threading in a similar manner as described with reference to section 102.

FIGS. 6, 7 and 8 show various views of a workable assembly 100, with FIG. 7 being in cross section. With particular reference to FIG. 7, a portion of first pipe conduit 204 provides a constituent element of telescopic end fitting 102. Similarly, a portion of second pipe element 206 provides a constituent element of telescopic end fitting 106.

The telescopic end fitting 102 in FIG. 7 includes pipe section 112 configured as a male member received inside first pipe conduit 202. One or more sealing element, such as O-ring 302A, is carried near the proximal end of first pipe conduit 202. Illustrated O-ring 302A forms a reciprocatable fluid-tight seal between an inside surface of conduit 204 and pipe section 112.

The exemplary and distally disposed coupling element, generally 700, of telescopic end fitting 102 in FIG. 7 is configured as a female threaded socket 702. Socket 702 typically carries conventional female pipe threads to form a fluid-tight seal with a plumbing element 208 having cooperating male pipe threads. Exterior surface 704 (see FIG. 8) may be gripped by a tool, e.g., a pipe wrench, to effect a fluid tight seal between socket 702 and a cooperating plumbing element 208.

In one alternative arrangement, the distal coupling element 700 carried at the distal end of pipe section 112 is configured to provide a male pipe nipple 706. A grabbable portion, such as hex element 708, may be provided to facilitate forming a fluid tight seal between a nipple 706 and a cooperating plumbing element 208. Additional alternative arrangements to form a coupling element 700 will be apparent to one of ordinary skill.

Figure 9:
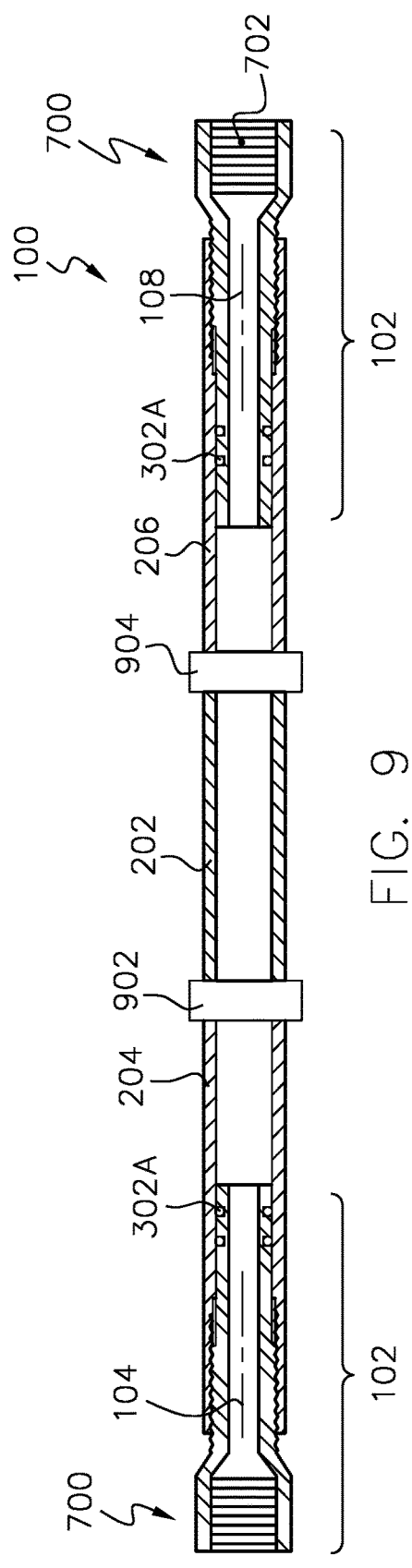
FIG. 9 is a side view, partially in cross-section, of an embodiment according to certain principles of the invention.

The embodiment 100 illustrated in FIG. 9 exemplifies one construction within the ambit of e.g., FIG. 2x. In contrast to the embodiment 100 in FIG. 7, FIG. 9 illustrates an assembly with similar telescopic end fittings 102 carried at opposite ends of a fluid conveying conduit. This embodiment may be arranged to dispose length-adjustment axes 104 and 108 collinearly, offset in parallel, or at an angle with respect to each other. For example, a shape of pipe section 202 may be user adjustable, or determined as a fixed configuration during manufacture of the assembly 100.

A generic coupling element 902 is illustrated between pipe or conduit section 202 and pipe or conduit section 204 in FIG. 9. A similar generic coupling element 904 is illustrated between pipe or conduit section 202 and pipe or conduit section 206. Elements 902 and 904 are intended to encompass all known structures and methods to join conduits or pipes together. It is further intended that FIG. 9 illustrates the condition where pipe or conduit sections 204, 202, and 206 are portions of one single unitary hard pipe or conduit. A single such unitary hard pipe or conduit may be bent as desired to dispose length adjustment axes 104 and 108 in a fixed nonparallel orientation, including orthogonal.

Figure 10:
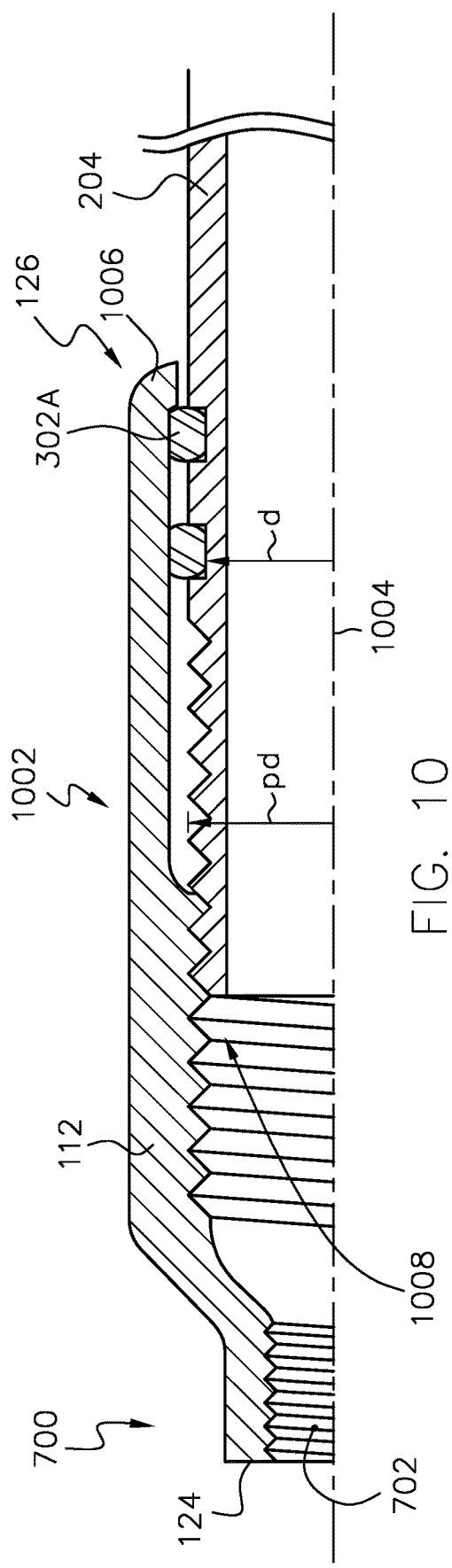
FIG. 10 is a side cross-section view of an alternative telescopic end fitting portion of a device constructed according to certain principles of the invention.

With reference now to FIG. 10, details of an alternative telescopic end fitting 1002 will now be discussed. An end fitting 1002 may be used in place of any end fitting illustrated in e.g., FIG. 1, 2B, 3, 7, 2B, or 9, and shall be considered as encompassed within the ambit disclosed by at least FIGS. 1 and 2B.

The pipe section 112 in FIG. 10 is configured as a female element in which to telescopically receive male pipe section 204. Consequently, one or more seal elements, e.g. seal 302A, are typically carried by the proximal end of male pipe element 204. Female and distal pipe element 112 is telescopically coupled to proximal pipe element 204 to permit length adjustment of end fitting 1002 along length adjusting axis 1004. Length adjusting axis 1004 is typically collinear with the centerline of pipe element 204, and may be interchangeably referenced.

In FIG. 10, distal end 124 of pipe section 112 is swaged or machined to provide an opening of reduced diameter compared to an outside diameter of pipe section 204. This opening may then be threaded to form a female threaded socket 702 in which to receive a cooperating plumbing element 208. It is within contemplation that the outside diameter of a fitting 702 (e.g., at distal end 124 in FIG. 10) may alternatively carry a length of tapered threads to couple with a plumbing element 208.

In certain cases, proximal end 126 of a pipe section 112 may be swaged after assembly to crimp the end 126 into a capture feature 1006 to structurally interfere with a seal (e.g., seal 302A), and thereby resist undesired disassembly of the telescopic end fitting 1002. That is, capture feature 1006 forms an obstruction carried at the proximal end of the female member 112 to form a structural interference and resist undesired disassembly of a telescopic end fitting 1002 in a distal direction.

While perhaps obvious to one of ordinary skill, certain threads (e.g., inside a socket 702) are desirably tapered pipe threads configured to compress into a fluid-tight seal upon assembly. In contrast, threads used for length adjustment (such as cooperating threaded sections indicated generally at 1008 in FIG. 10), desirably are straight threads to permit unfettered length adjustment.

In FIG. 10, the male member of illustrated fitting 1002 is an integral extension of the fluid conveyance conduit 204. As mentioned above, it is within contemplation that conduits 204, 202, and 206 (see FIG. 2) can be embodied to form an integral hard pipe 110. In that case, an end of such pipe 110 would provide the male member of a fitting 1002.

Still with reference to FIG. 10, it may be seen that the inside diameter "d" of seal 301A is smaller than the maximum pitch diameter "pd" of the length-adjusting threads carried by pipe section 204. Consequently, the telescopic end fitting 1002 is configured to require the fluid seal 302A to traverse proximally across those straight threads during an assembly step.

The exemplary embodiment 100 illustrated in FIG. 10 also includes a distal pipe element 112 that has a necked-down distal end. The opening provided by socket 702 is smaller than the maximum pitch diameter "pd". Therefore, the pipe section 112 has an inherent stop feature to resist proximal travel of pipe 112 beyond a certain point of registration with pipe 204.

Rather than being a unitary part, as illustrated in FIG. 10, pipe 112 of telescopic end fitting 1002 may be constructed as an assembly of cooperating parts. For example, a distal cap may replace the reduced-diameter portion of pipe 112. Such a distal cap may essentially be embodied as a thimble, with an aperture having female threads disposed concentric to a length adjusting axis or centerline of a thimble's "conventionally closed" end. The threaded aperture may be sized to couple to a plumbing element 208. A threaded portion of the thimble's larger diameter and "open" end may be threaded (internally or externally) to couple with the distal end of pipe 112. Another thimble-like cap may be provided at the opposite end of pipe 112 to replace the swaged end 1006 and capture a seal 302A.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. An apparatus, comprising:
 a fluid conveyance conduit to provide a portion of a fluid path between a first plumbing element and a second plumbing element;
 a first telescopic end fitting carried at a first end of the fluid conveyance conduit; and
 a second telescopic end fitting carried at a second end of the fluid conveyance conduit, wherein:
 the first telescopic end fitting is configured to provide a fluid-tight connection to the first plumbing element and the second telescopic end fitting is configured to provide a fluid-tight connection to the second plumbing element to complete the fluid path, each telescopic end fitting having a user-selectable length along a telescopic length-adjusting axis; and
 the first telescopic end fitting comprises:
 a male member carrying first straight threads on a first OD;
 a female member carrying second straight threads on a first ID, the first and second straight threads being cooperatively sized to engage and permit user adjustment of a relative position of the male member with respect to the female member, and thereby, to adjust a length of the telescopic end fitting along a telescopic length-adjusting axis of the first telescopic end fitting; and
 a first fluid seal carried by the male member for reciprocal fluid-tight sealing engagement of the first fluid seal between the male and female members, wherein:
 a proximal end of the female member has a first diameter sized to receive the male member; and
 a distal end of the female member is necked-down to provide a second diameter that is smaller than the first diameter, the distal end being configured to couple with one of the first and second plumbing element.

2. The apparatus of claim 1, wherein:
 the distal end of the female member carries a length of inside pipe threads having a nominal pipe thread diameter smaller than the maximum pitch diameter of the first straight threads, the inside pipe threads to couple to one of the first and second plumbing elements.

3. The apparatus of claim 1, wherein:
 the distal end of the female member carries a length of outside pipe threads, the outside pipe threads to couple to one of the first and second plumbing elements.

4. The apparatus of claim 1, wherein:
 subsequent to partial assembly, the proximal end of the female member is crimped to entrap the first fluid seal.

* * * * *